May 14, 1935.  H. A. TREBLER  2,001,555
DEVICE FOR THE IRRADIATION OF MILK WITH ULTRAVIOLET RAYS
Filed March 15, 1934   2 Sheets-Sheet 1
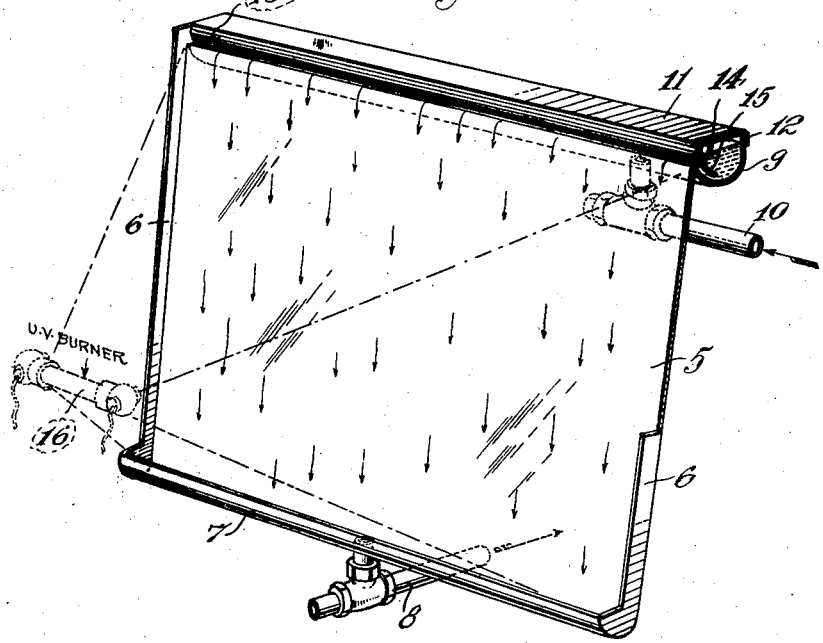
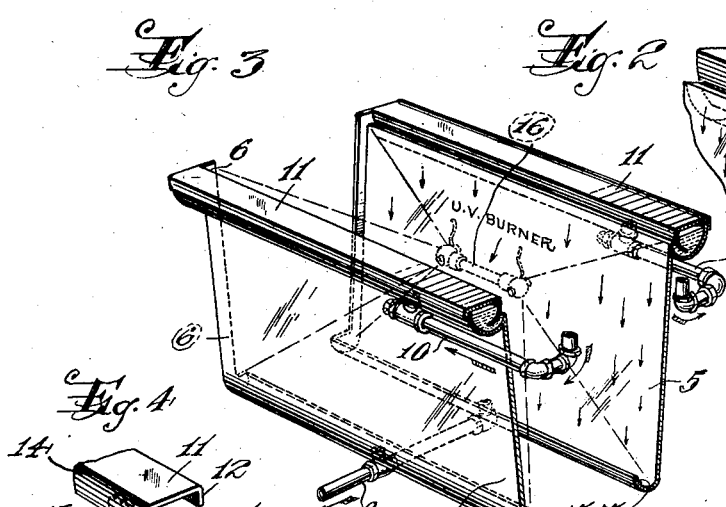
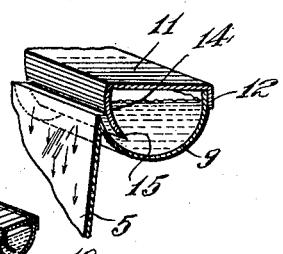
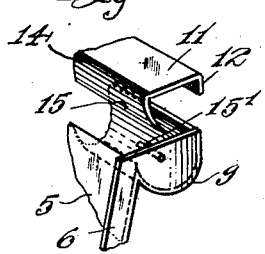
INVENTOR
Henning A. Trebler,
BY
ATTORNEY

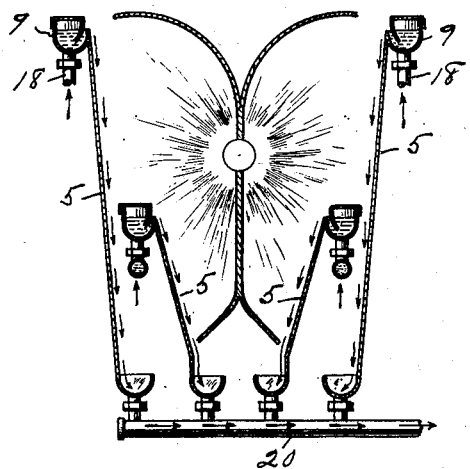
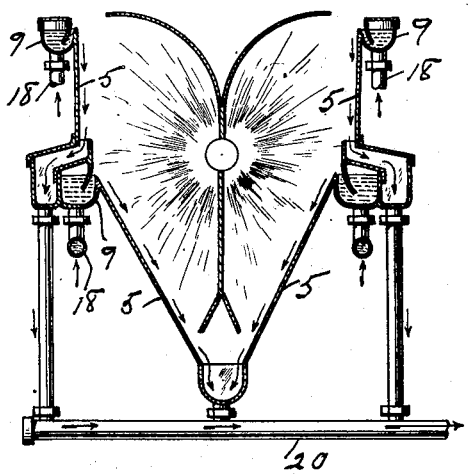
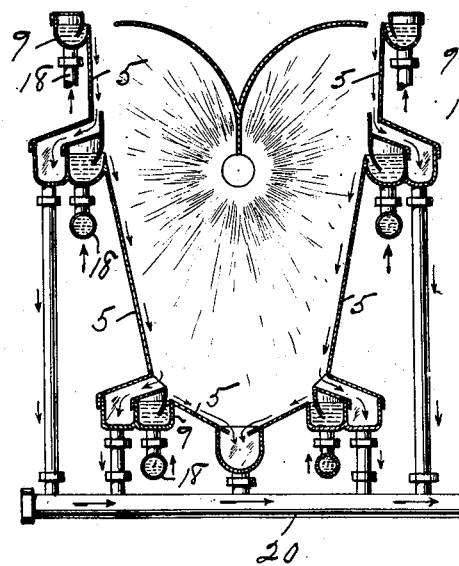
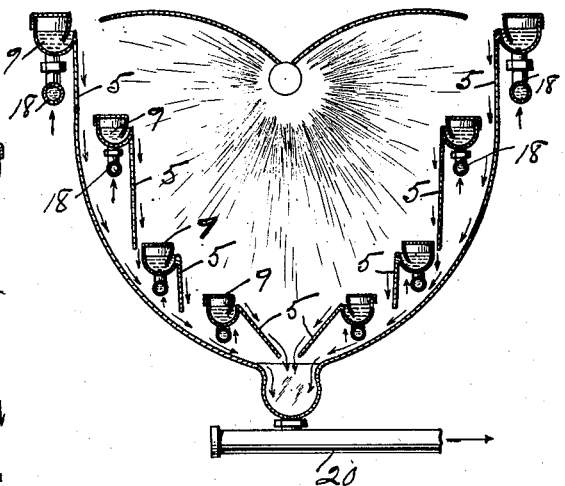

Patented May 14, 1935

2,001,555

UNITED STATES PATENT OFFICE 2,001,555

DEVICE FOR THE IRRADIATION OF MILK WITH ULTRAVIOLET RAYS

Henning A. Trebler, Baltimore, Md., assignor to Hanovia Chemical and Manufacturing Company, Newark, N. J., a corporation of New Jersey Application March 15, 1934, Serial No. 715,577

9 Claims. (Cl. 99—2)

This invention relates to devices for irradiating milk and other fluids with ultraviolet or electromagnetic rays, and more particularly to a device for causing the milk or other fluids to flow over a surface in a smooth, uniform, bubble-free layer.

In treating fluids with ultraviolet rays, it has heretofore been the practice to cause the fluid being treated to flow in a more or less irregular or agitated film in the path of the ultraviolet rays. For the best results, I have found it advantageous that the layer or film of fluid have no bubbles, foam, or foreign matter therein while being subjected to the ultraviolet rays and that the thickness of the film and the rate of flow be maintained as nearly constant as possible. The presence of bubbles, foam or foreign matter may interfere with the production of the activated products resulting from ultraviolet irradiation and may impart an undesirable flavor to the milk.

It is therefore an object of this invention, to provide a trough from which the fluid is caused to flow over an inclined or vertical surface, said trough being provided with means to break up the bubbles and to hold back foam or foreign matter before they reach the vertical or inclined plane or smooth curved surface.

A further advantage of my construction is that no small orifices as commonly employed in distributing devices for spreading films over surfaces, are embodied in the apparatus. Consequently the danger of clogging is avoided, and an even film thickness and an even rate of flow may be much more constantly maintained than would otherwise be the case.

These and other advantageous objects, which will later appear, are accomplished by the simple and practical construction and arrangement of parts hereinafter described and exhibited in the accompanying drawings, forming part hereof, and in which:

Fig. 1 is a perspective view of my device,

Fig. 2 is a perspective view in section showing details of the device,

Fig. 3 is a perspective view showing the manner in which the device is used in combination with an ultraviolet ray producing machine, Fig. 4 is a perspective view showing further details of the device, and Figs. 5, 6, 7 and 8 are sectional elevations of modified forms of my device in which a number of units or sheets are shown suitably grouped about an ultraviolet generator, and in which the length of the units or sheets and the slope thereof are determined by the desired thickness of the liquid film and the rate of flow and the degree of activation desired, so as to obtain essentially the same degree of activation from each unit.

Referring to the drawings, the device is shown to include an inclined flat sheet 5, preferably made of metal, over which milk or other fluid flows in a thin film. The side edges of the sheet 5 are provided with flanges 6, and the lower edge of the sheet is curved upwardly to form a small semicylindrical trough 7 to receive the fluid after it has passed over the sheet 5. Connected to the trough 7 is a pipe 8 through which the fluid can be drained off.

The upper edge of the sheet 5 is also provided with a semicylindrical trough 9 into which milk or other fluid is introduced by a pipe 10.

The trough 9 is provided with a cover 11, having a flange 12 engaging one edge of the trough, see Fig. 4, the cover being further supported by pins 15', projecting from the flanges 6. The cover 11 is also provided with a downwardly extending curved flange 14 having a knife edge 15 projecting into the trough.

In operation, milk or other fluid is introduced into the trough 9, and passes between the bottom of the trough 9 and the flange 14 to the sheet 5. During the passage of the milk, the knife edge 15 breaks up the bubbles and holds back any foam or foreign matter that may be present. As the milk passes over the sheet 5, it is irradiated by an ultraviolet producing device 16, shown in dotted lines in Fig. 3.

It is seen that the cover 11 can be readily removed in order to clean the trough 9; and the junction of the sheet 5 and the trough 9 is also provided with a relatively sharp edge to further disrupt bubbles, foam, and foreign matter so that the milk will flow freely over the sheet 5 in a smooth film.

The flange portion 14 of the cover 11, shown arcuately curved in the drawings, may, if desired, be directed straight downwardly.

I have found it advantageous to group a number of units, such as described above, about an ultraviolet generator, suitable arrangements being illustrated in Figs. 5, 6, 7 and 8. In this arrangement, the length of sheets 5 and their slope are determined by the desired thickness of the liquid film and the rate of flow and the degree of activation desired, and in such a way that essentially the same degree of activation is obtained in each unit.

The milk is conducted through the pipes 18, through the troughs 9, over the sheets 5 and is drained off through the pipes 20 as clearly indicated by the arrows.

By "activation" is meant the production of vitamin in the liquid. The degree of activation is commonly expressed in the number of rat units of vitamin contained therein per unit of volume or weight of the liquid.

The penetration of ultraviolet into many liquids, such as milk, is very slight. It is therefore important to the efficiency of the process that the liquid be exposed to the radiations in very thin films. The reaction with the use of very intense ultraviolet sources is of very short duration, a few seconds or less. Hence, the distance down which the film of liquid must travel may be relatively short, only a few inches.

My invention which provides a very thin, bubble-free, smooth flowing liquid film provides an efficient means for the attainment of activation without interference by gas bubbles, foam and foreign particles and without the production of undesirable flavors due to their presence. A multiplicity of my units mounted about the light source provide an aggregate which can handle a large volume of liquid with the attainment of high potency and an economic utilization of the radiation energy.

From the above description, it will be seen that I have provided a simple and convenient and improved device for causing milk and other fluids to flow in a smooth film over a surface free from gas or air bubbles, foam or any coarse suspended particles which would tend to produce an uneven film, during the process of irradiating the fluid with ultraviolet or other vitamin producing or bacterial destroying radiations, this being essential for efficient irradiation.

The foregoing disclosure is to be regarded as descriptive and illustrative only, and not as restrictive or limitative of the invention, of which obviously an embodiment may be constructed including many modifications without departing from the general scope herein indicated and denoted in the appended claims.

Having thus described my invention, what I claim as new and desire to secure by Letters Patent, is:

1. In an apparatus for the irradiation of flowing liquid films, one or more inclined or vertical surfaces over which said liquid flows, a trough connected to the upper edge of each of said surfaces, a knife edge at the junction between said trough and said surface, one or more baffles in said trough to disperse air or gas bubbles, and to hold back foam and suspended particles in the liquid before said liquid flows over the irradiation surfaces.

2. In a device for the irradiation of milk or other fluids, a plane surface over which said milk flows during exposure to vitamin producing and bacteria killing radiations, integral flanges at the side edges of said plane surface, a trough attached to the upper edge of said plane surface, a cover for said trough, said cover having an arcuate flange depending into the upper portion of the liquid in the trough adjacent the point where the milk begins to flow over the plane surface.

3. In a device for the irradiation of milk and other fluids, a curved smooth surface over which said milk flows during exposure to vitamin producing and bacteria killing radiations, integral flanges at the side edges of said surface, a trough attached to the upper edge of said surface, a cover for said trough, said cover having an arcuate flange depending into the upper portion of the liquid in the trough adjacent the point where the milk begins to flow over the surface.

4. In a device for the irradiation of milk or other fluids, an inclined or vertical surface over which the milk flows during the irradiating process, a trough connected to the upper edge of said surface, means for introducing milk or other fluids to said trough, and a cover for the trough, said cover having a flange provided with means depending into the trough adjacent the upper edge of said surface to hold back or break up bubbles and to hold back foreign matter in the milk or other fluid before it commences to flow over said surface.

5. In a device for the irradiation of milk or other fluids, a sheet over which said milk flows during the irradiating process, a trough integral with the upper edge of said sheet, a cover for the trough, and an arcuate flange integral with the cover and projecting into said trough, said flange having integral therewith means adjacent the upper edge of the sheet to break up bubbles and to hold back foreign matter in the milk before it commences to flow over the sheet.

6. In a device for the irradiation of milk or other fluids, a flat sheet over which said milk flows during the irradiating process, integral flanges at the side edges of said flat sheet, the lower end of the sheet being upturned to provide a trough, the upper edge of the sheet being bent to provide a semi-cylindrical trough to receive milk, a cover for said upper trough, said cover having an arcuate flange with a knife edge depending into the upper trough adjacent the point where the milk begins to flow over the sheet, means for conducting milk to the upper trough, and means for draining milk from the lower trough.

7. In a device for the irradiation of milk or other fluids, a flat sheet over which said milk flows during the irradiating process, a semi-cylindrical trough integral with the upper edge of said sheet, a cover for the trough, and an arcuate flange integral with the cover and projecting into said trough, said flange having integral therewith a knife edge adjacent the upper edge of the sheet to break up bubbles and to hold back foreign matter in the milk before it commences to flow over the sheet.

8. In a device for the irradiation of milk or other fluids, a flat inclined surface over which said milk flows, a trough connected to the upper edge of said surface, and a member having a knife edge projecting into said trough adjacent the upper edge of the surface to break up bubbles and to hold back foreign matter in the milk before the milk commences to flow over the flat surface.

9. In a device for the irradiation of milk or other fluids, a flat inclined surface over which the milk flows during the irradiating process, a trough connected to the upper edge of said surface, means for introducing milk or other fluids to said trough, and a cover for the trough, said cover having a flange provided with a knife edge depending into the trough adjacent the upper edge of said surface to break up bubbles and to hold back foreign matter in said milk or other fluid before it commences to flow over said surface.

HENNING A. TREBLER.